United States Patent
Thompson

(10) Patent No.: US 6,565,636 B1
(45) Date of Patent: May 20, 2003

(54) EXHAUST CLEANING DEVICE

(76) Inventor: Benjamin G. Thompson, 12160 A Ladner Rd., Grand Bay, AL (US) 36541

( * ) Notice: Subject to any disclaimer, the term of this patent is extended or adjusted under 35 U.S.C. 154(b) by 83 days.

(21) Appl. No.: 09/904,759

(22) Filed: Jul. 13, 2001

(51) Int. Cl.[7] ............................................... B01D 47/06
(52) U.S. Cl. ......................... 96/241; 96/246; 96/253; 96/273; 96/274; 96/277; 96/326
(58) Field of Search ........................ 96/240, 241, 243, 96/270, 271, 273, 274, 277, 326, 246, 253; 95/205, 214, 216, 217, 213, 149

(56) References Cited

U.S. PATENT DOCUMENTS

| | | | |
|---|---|---|---|
| 2,737,260 A | * | 3/1956 | Jenison |
| 3,282,047 A | * | 11/1966 | Wertheimer |
| 3,353,336 A | * | 11/1967 | Caballero |
| 3,473,299 A | * | 10/1969 | Powers |
| 3,640,054 A | * | 2/1972 | Katz |
| 3,763,634 A | * | 10/1973 | Alliger |
| 3,768,981 A | * | 10/1973 | Alliger |
| 4,353,845 A | * | 10/1982 | Chartrand et al. |
| 4,585,599 A | * | 4/1986 | Czarno |
| 4,875,335 A | | 10/1989 | Arai et al. |
| 4,881,959 A | | 11/1989 | Kono et al. |
| 4,929,258 A | * | 5/1990 | Chin-Hua |
| 5,138,835 A | | 8/1992 | Bender et al. |
| 5,272,874 A | | 12/1993 | Paas |
| 5,305,602 A | | 4/1994 | Kojima et al. |
| 5,855,822 A | * | 1/1999 | Chen |
| D421,649 S | | 3/2000 | Cappuyns |
| 6,350,302 B1 | * | 2/2002 | Hallstead, Sr. |

* cited by examiner

Primary Examiner—Duane S. Smith

(57) ABSTRACT

An exhaust cleaning device for removing a portion of carbon containing molecules from exhaust. The exhaust cleaning device includes a tubular member which is elongate and has a first end and a second end. The first and second ends are placed in communication with an exhaust system. The tubular member has a middle section and two legs. A cleaning assembly for cleaning the exhaust includes a plurality of apertures extending through the middle section of the tubular member. A housing is attached to an outer surface of the bottom half of the middle section and covers the apertures such that the apertures extend into the housing. A container is extendable into the housing. A filter member is removably positioned in the container. A water pump sprays water into the tubular member such that the water binds to carbon containing molecules in the exhaust and deposits the molecules in the filter.

12 Claims, 3 Drawing Sheets

EXHAUST CLEANING DEVICE

BACKGROUND OF THE INVENTION

1. Field of the Invention

The present invention relates to exhaust systems and more particularly pertains to a new exhaust cleaning device for removing a portion of carbon containing molecules from exhaust.

2. Description of the Prior Art

The use of exhaust systems is known in the prior art. More specifically, exhaust systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,138,835; U.S. Pat. No. 4,881,959; U.S. Pat. No. 5,272,874; U.S. Pat. No. 5,305,602; U.S. Pat. No. 4,875,335; and U.S. Des. Pat. No. 421,649.

While these devices fulfill their respective, particular objectives and requirements, the aforementioned patents do not disclose a new exhaust cleaning device. The inventive device includes a tubular member which is elongate and has a first end and a second end. The first and second ends are placed in communication with an exhaust system such that gas exhaust flows into the first end and outwardly through the second end. The tubular member has a middle section and two legs extending upwardly from the middle section such that the tubular member generally has a U-shape. A cleaning assembly for cleaning the exhaust includes a plurality of apertures extending through a bottom half of the middle section of the tubular member. A housing is attached to an outer surface of the bottom half of the middle section and covers the apertures such that the apertures extend into the housing. The housing has an opening therein. A container is extendable into the opening. A filter means is removably positioned in the container. A water pump is in communication with a supply tank. A supply line is has a first end fluidly coupled to the water pump and a second end fluidly coupled to the tubular member. The second end is located nearer the first end than middle section. A fluid is located in the supply tank. The fluid comprises water is basic and has a pH greater than 9. The fluid is injected into the tubular member such that the fluid binds to carbon containing molecules in the exhaust and deposits the molecules in the filter.

In these respects, the exhaust cleaning device according to the present invention substantially departs from the conventional concepts and designs of the prior art, and in so doing provides an apparatus primarily developed for the purpose of removing a portion of carbon containing molecules from exhaust.

SUMMARY OF THE INVENTION

In view of the foregoing disadvantages inherent in the known types of exhaust systems now present in the prior art, the present invention provides a new exhaust cleaning device construction wherein the same can be utilized for removing a portion of carbon containing molecules from exhaust.

The general purpose of the present invention, which will be described subsequently in greater detail, is to provide a new exhaust cleaning device apparatus and method which has many of the advantages of the exhaust systems mentioned heretofore and many novel features that result in a new exhaust cleaning device which is not anticipated, rendered obvious, suggested, or even implied by any of the prior art exhaust systems, either alone or in any combination thereof.

To attain this, the present invention generally comprises a tubular member which is elongate and has a first end and a second end. The first and second ends are placed in communication with an exhaust system such that gas exhaust flows into the first end and outwardly through the second end. The tubular member has a middle section and two legs extending upwardly from the middle section such that the tubular member generally has a U-shape. A cleaning assembly for cleaning the exhaust includes a plurality of apertures extending through a bottom half of the middle section of the tubular member. A housing is attached to an outer surface of the bottom half of the middle section and covers the apertures such that the apertures extend into the housing. The housing has an opening therein. A container is extendable into the opening. A filter means is removably positioned in the container. A water pump is in communication with a supply tank. A supply line is has a first end fluidly coupled to the water pump and a second end fluidly coupled to the tubular member. The second end is located nearer the first end than middle section. A fluid is located in the supply tank. The fluid comprises water is basic and has a pH greater than 9. The fluid is injected into the tubular member such that the fluid binds to carbon containing molecules in the exhaust and deposits the molecules in the filter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new exhaust cleaning device apparatus and method which has many of the advantages of the exhaust systems mentioned heretofore and many novel features that result in a new exhaust cleaning device which is not anticipated, rendered obvious, suggested, or even implied by any of the prior art exhaust systems, either alone or in any combination thereof.

It is another object of the present invention to provide a new exhaust cleaning device which may be easily and efficiently manufactured and marketed.

It is a further object of the present invention to provide a new exhaust cleaning device which is of a durable and reliable construction.

An even further object of the present invention is to provide a new exhaust cleaning device which is susceptible of a low cost of manufacture with regard to both materials and labor, and which accordingly is then susceptible of low prices of sale to the consuming public, thereby making such exhaust cleaning device economically available to the buying public.

Still yet another object of the present invention is to provide a new exhaust cleaning device which provides in the apparatuses and methods of the prior art some of the advantages thereof, while simultaneously overcoming some of the disadvantages normally associated therewith.

Still another object of the present invention is to provide a new exhaust cleaning device for removing a portion of carbon containing molecules from exhaust.

Yet another object of the present invention is to provide a new exhaust cleaning device which includes a tubular member which is elongate and has a first end and a second end. The first and second ends are placed in communication with an exhaust system such that gas exhaust flows into the first end and outwardly through the second end. The tubular member has a middle section and two legs extending upwardly from the middle section such that the tubular member generally has a U-shape. A cleaning assembly for cleaning the exhaust includes a plurality of apertures extending through a bottom half of the middle section of the tubular member. A housing is attached to an outer surface of the bottom half of the middle section and covers the apertures such that the apertures extend into the housing. The housing has an opening therein. A container is extendable into the opening. A filter means is removably positioned in the container. A water pump is in communication with a supply tank. A supply line is has a first end fluidly coupled to the water pump and a second end fluidly coupled to the tubular member. The second end is located nearer the first end than middle section. A fluid is located in the supply tank. The fluid comprises water is basic and has a pH greater than 9. The fluid is injected into the tubular member such that the fluid binds to carbon containing molecules in the exhaust and deposits the molecules in the filter.

Still yet another object of the present invention is to provide a new exhaust cleaning device that removes carbon containing molecules from the exhaust without substantially impeding exhaust flow through the exhaust system.

Even still another object of the present invention is to provide a new exhaust cleaning device that produces cleaner exhaust, particularly exhaust from diesel engines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
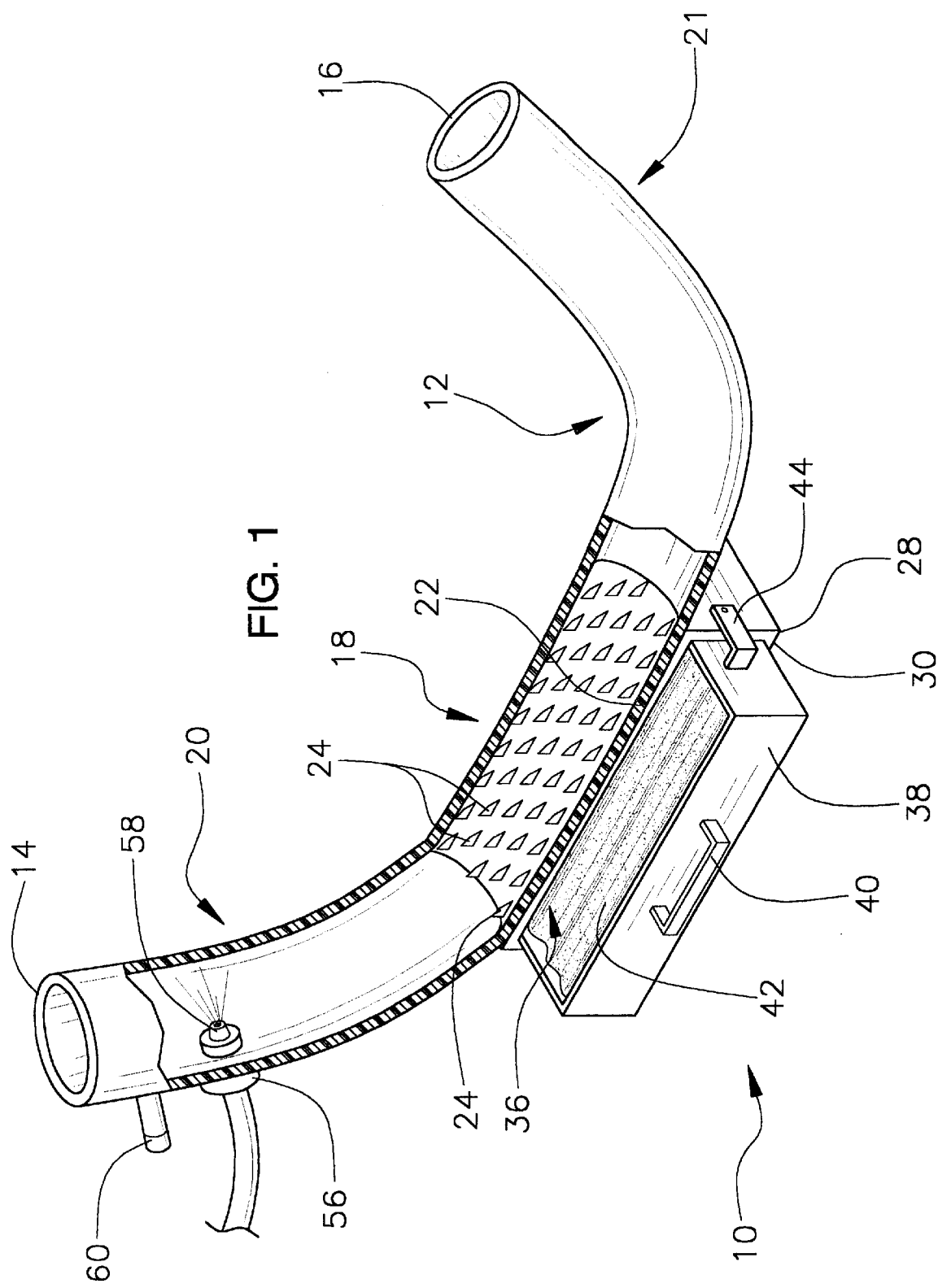
FIG. 1 is a schematic perspective view of a new exhaust cleaning device according to the present invention.
Figure 2:
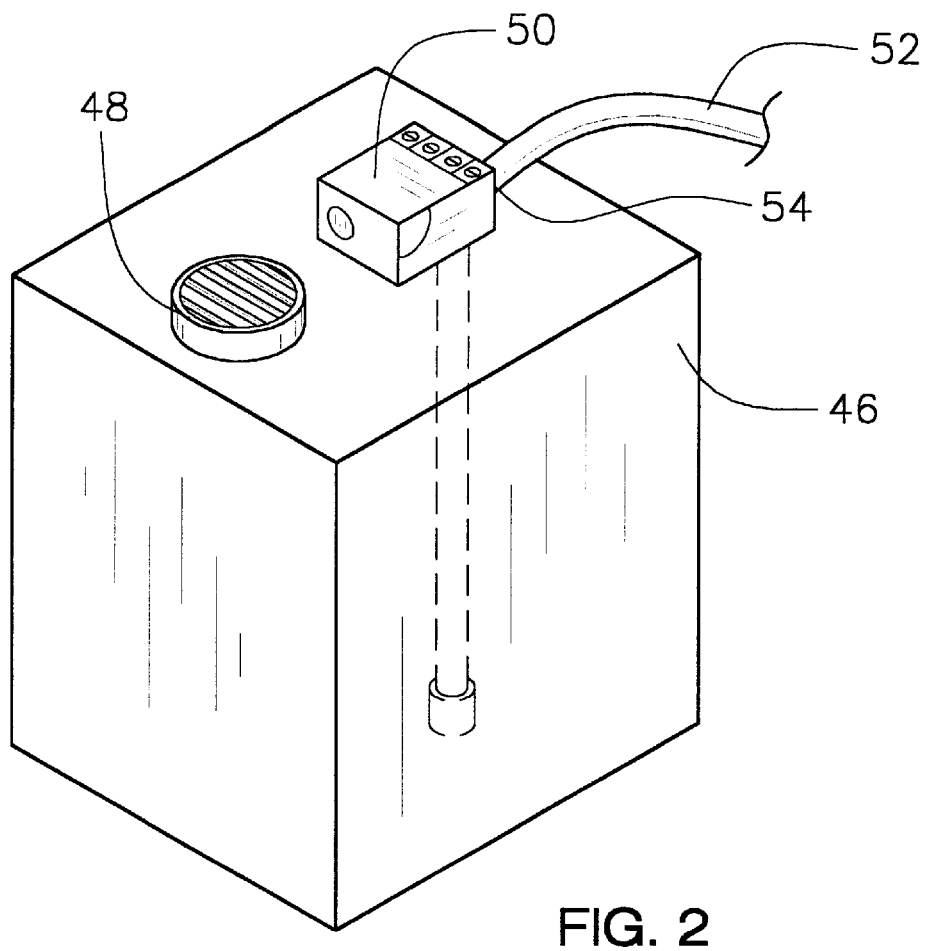
FIG. 2 is a schematic perspective view of the supply tank of the present invention.
Figure 3:
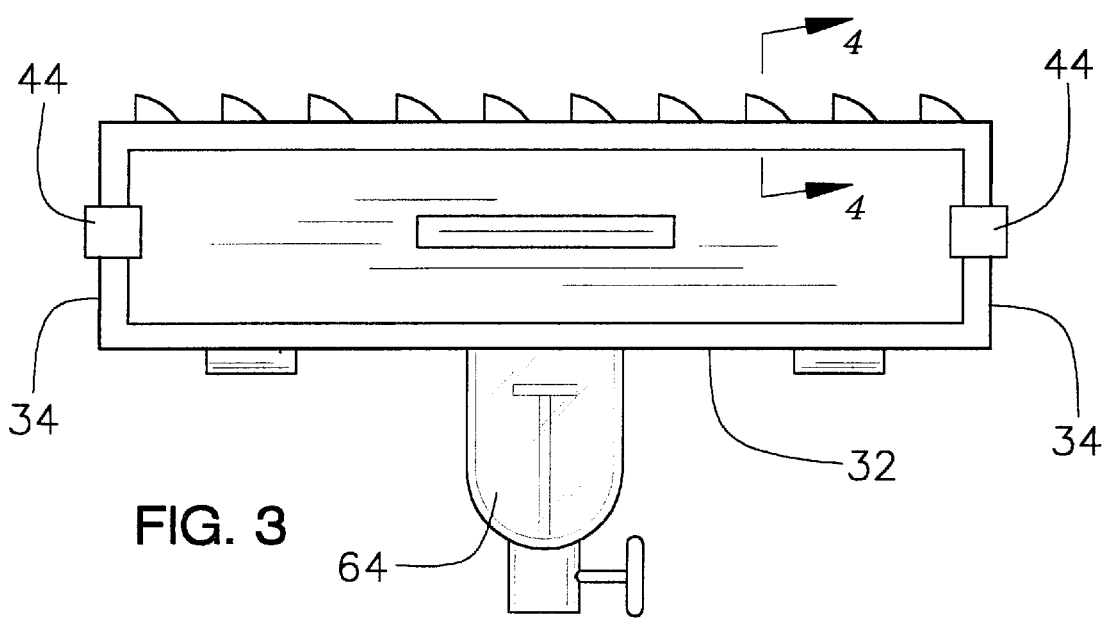
FIG. 3 is a schematic side view of the present invention.
Figure 4:
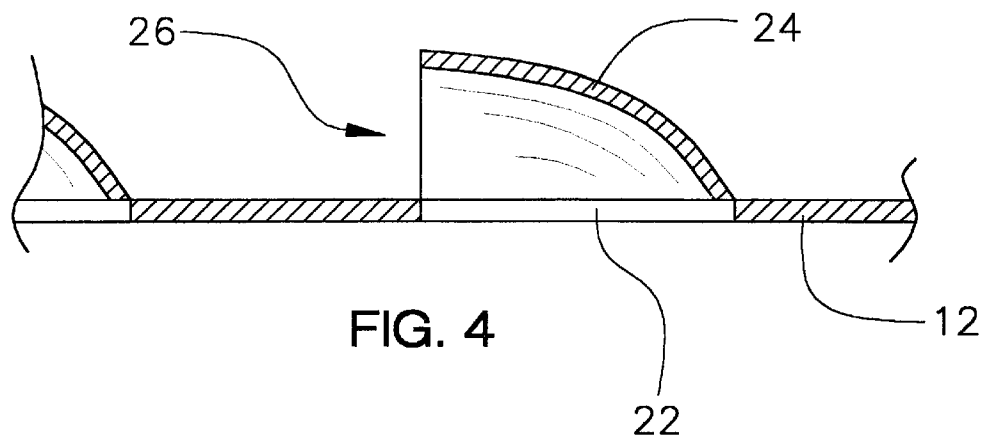
FIG. 4 is a schematic cross-sectional view of a hood of the present invention taken along line 4—4 of FIG. 3.
Figure 5:
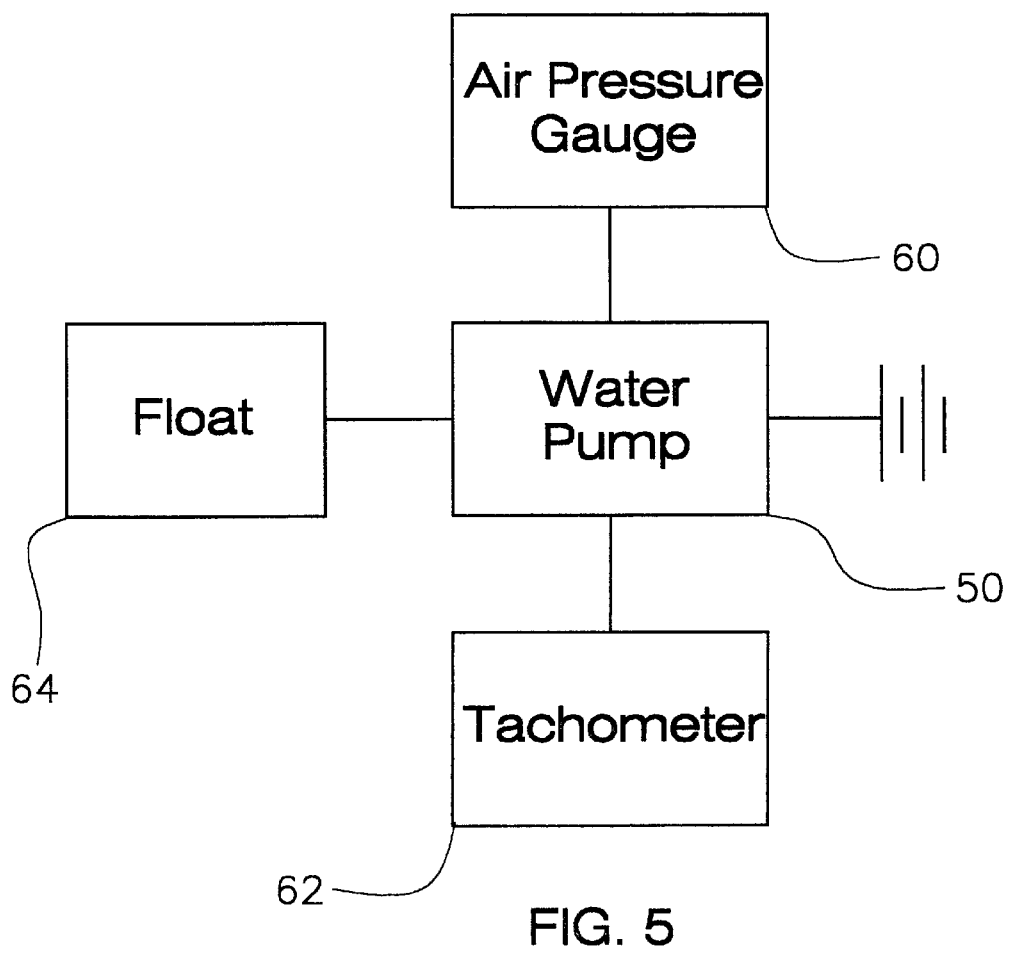
FIG. 5 is a schematic view of the present invention.

With reference now to the drawings, and in particular to FIGS. 1 through 5 thereof, a new exhaust cleaning device embodying the principles and concepts of the present invention and generally designated by the reference numeral 10 will be described.

As best illustrated in FIGS. 1 through 5, the exhaust cleaning device 10 generally comprises a device for placement in fluid communication with an exhaust system of a diesel engine. This device may also be used for gasoline engines. The device comprises a tubular member 12 that is elongate and has a first end 14 and a second end 16. The first 14 and second 16 ends are placed in communication with the exhaust system such that gas exhaust flows into the first end 14 and outwardly through the second end 16. The tubular member 12 has a middle section 18 and two legs 20, 21 extending upwardly from the middle section 18 such that the tubular member 12 generally has a U-shape. The tubular member 12 is generally cylindrical shaped.

A cleaning assembly for cleaning the exhaust includes a plurality of apertures 22 extending through a bottom half of the middle section 18 of the tubular member 12. The apertures 22 are spaced from each other. Each of a plurality of hoods 24 is attached to a peripheral edge of and generally covering each of the apertures 22. Each of the hoods 24 is concave and extends inward of the tubular member 12. The hoods 24 each have a proximal side 26 with respect to the first end 14 of the tubular member 12 which is open such that the hoods 24 act as traps and exhaust travels through the apertures 22.

A housing 28 is attached to an outer surface of the bottom half of the middle section 18 and covers the apertures 22 such that the apertures 22 extend into the housing 28. The housing 28 includes a front wall 30, a bottom wall 32, a back wall and a pair of side walls 34. The front wall 30 has an opening 36 therein. A container 38 is extendable into the opening 36 and positionable below the apertures 22 such that an open top side of the container 38 is facing the apertures 22. A handle 40 is preferably attached to the container 38. A filter means 42 is removably positioned in the container 38. The filter means 42 being a conventional air filter type device or a wire mesh.

A securing means 44 releasably secures the container 38 in the housing 28. The securing means 44 comprises a pair of clips each attached to one of the side walls 34 of the housing and extending over the opening 36. The clips are biased to extend over the container 38 and may be urged back away from the container 38 for removing the container 38 from the housing 28. The securing means 44 prevents the container 38 from being forced out of the housing 28 by high air pressure within the tubular member 12.

A supply tank 46 has a hole therein. A cap 48 is removably attached to the supply tank 46 for selectively closing the hole. The cap 48 is removed in order to fill the supply tank 46.

A conventional water pump 50 is in communication with the supply tank 46. A supply line 52 is has a first end 54 fluidly coupled to the water pump 50 and a second end 56 fluidly coupled to the tubular member 12. The second end 56 is located nearer the first end 14 than middle section 18. The second end 56 has a nozzle 58 thereon for spraying water into the tubular member 12 at a generally perpendicular angle with respect to the flow of exhaust.

An air pressure gauge 60 is in communication with the tubular member 12 and is operationally coupled to the water pump 50 such the water pump 50 increases flow with increase of air pressure. Alternatively, or in addition to the air pressure gauge 60, the water pump may be operationally coupled to a tachometer 62 of the engine such that the water pump 50 increases flow with increase of the tachometer. Also envisioned is a float 64 being attached to the bottom wall of the housing 28 and operationally coupled to the water pump 50. The pump 50 is turned off if the float 64 is filled with a fluid. This is useful in case the device 10 is used on a boat motor. If the boat begins to fill with water, the float 64 will turn off the water pump 50 so that fluid being pumped by the water pump 50 does not back up into the exhaust system of the engine.

A fluid is located in the supply tank 46. The fluid preferably comprises water which is basic and has a pH greater than 9. Ideally, the pH is between 12 and 14. This may be achieved by conventional methods such that the addition of NaOH.

In use, the fluid is injected into the tubular member 12 such that the fluid binds to carbon containing molecules in the exhaust. These bound carbon molecules are then blown into through the apertures and deposited in the filter 42. The water vaporizes due to the heat and escaped through the filter 42 and outwardly through the second end 16 of the tubular member 14. The filter 42 may be removed for cleaning or replacement. The water is basic so that it neutralizes what would be an acidic solution when the water binds to the carbon containing molecules due to sulfur dioxide in the exhaust.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An exhaust cleaning device for placement in fluid communication with an exhaust system of a diesel engine, said device comprising:
    a tubular member being elongate and having a first end and a second end, said first and second ends being placed in communication with the exhaust system such that gas exhaust flows into said first end and outwardly through said second end, said tubular member having a middle section and two legs extending upwardly from said middle section such that said tubular member generally has a U-shape;
    a cleaning assembly for cleaning the exhaust including;
        a plurality of apertures extending through a bottom half of said middle section of said tubular member;
        a housing being attached to an outer surface of said bottom half of said middle section and covering said apertures such that said apertures extend into said housing, said housing having an opening therein;
        a container being extendable into said opening;
        a filter means being removably positioned in said container;
    a supply tank;
    a water pump being in communication with said supply tank;
    a supply line being having a first end fluidly coupled to said water pump and a second end fluidly coupled to said tubular member, said second end being located nearer said first end than middle section;
    a fluid being located in said supply tank, said fluid comprising water being basic and having a pH greater than 9; and
    wherein said fluid is injected into said tubular member such that said fluid binds to carbon containing molecules in the exhaust and deposits said molecules in said filter.

2. The exhaust cleaning device as in claim 1, further including a plurality of hoods being attached to a peripheral edge of and generally covering each of said apertures, each of said hoods being concave and extending inward of said tubular member, each of said hoods having a proximal side with respect to said first end of said tubular member, each of said front sides being open.

3. The exhaust cleaning device as in claim 1, wherein said housing includes.a front wall, a bottom wall, a back wall and a pair of side walls, said front wall having said opening therein.

4. The exhaust cleaning device as in claim 3, further including a securing means releasably secures said container in said housing.

5. The exhaust cleaning device as in claim 4, wherein said securing means comprises a pair of clips each attached to one of said side walls of said housing and extending over said opening.

6. The exhaust cleaning device as in claim 1, further including a handle being attached to said container.

7. The exhaust cleaning device as in claim 1, wherein said supply tank has a hole therein, a cap being removably attached to said supply tank for selectively closing said hole.

8. The exhaust cleaning device as in claim 1, further including said second end of said supply line having a nozzle thereon for spraying water into said tubular member at a generally perpendicular angle with respect to the flow of exhaust.

9. The exhaust cleaning device as in claim 1, further including an air pressure gauge being in communication with said tubular member and being operationally coupled to said water pump such the water pump increases flow with increase of air pressure.

10. The exhaust cleaning device as in claim 1, further including said water pump being operationally coupled to a tachometer of the engine such that the water pump increases flow with increase of the tachometer.

11. The exhaust cleaning device as in claim 1, a float being attached to said bottom wall of said housing and operationally coupled to said pump, wherein said pump is turned off when said float is filled with a fluid.

12. An exhaust cleaning device for placement in fluid communication with an exhaust system of a diesel engine, said device comprising:

- a tubular member being elongate and having a first end and a second end, said first and second ends being placed in communication with the exhaust system such that gas exhaust flows into said first end and outwardly through said second end, said tubular member having a middle section and two legs extending upwardly from said middle section such that said tubular member generally has a U-shape, said tubular member being generally cylindrical shaped;
- a cleaning assembly for cleaning the exhaust including;
  - a plurality of apertures extending through a bottom half of said middle section of said tubular member, said apertures being spaced from each other;
  - a plurality of hoods being attached to a peripheral edge of and generally covering each of said apertures, each of said hoods being concave and extending inward of said tubular member, each of said hoods having a proximal side with respect to said first end of said tubular member, each of said front sides being open such that exhaust may travel through said aperture;
  - a housing being attached to an outer surface of said bottom half of said middle section and covering said apertures such that said apertures extend into said housing, said housing including a front wall, a bottom wall, a back wall and a pair of side walls, said front wall having an opening therein;
  - a container being extendable into said opening and positionable below said apertures such that an open top side of said container is facing said apertures;
  - a filter means being removably positioned in said container;
  - a securing means releasably secures said container in said housing, said securing means comprising a pair of clips each attached to one of said side walls of said housing and extending over said opening;
  - a handle being attached to said container;
- a supply tank having a hole therein, a cap being removably attached to said supply tank for selectively closing said hole;
- a water pump being in communication with said supply tank;
- a supply line being having a first end fluidly coupled to said water pump and a second end fluidly coupled to said tubular member, said second end being located nearer said first end than middle section, said second end having a nozzle thereon for spraying water into said tubular member at a generally perpendicular angle with respect to the flow of exhaust;
- an air pressure gauge being in communication with said tubular member and being operationally coupled to said water pump such the water pump increases flow with increase of air pressure;
- a fluid being located in said supply tank, said fluid comprising water being basic and having a pH greater than 9; and
- wherein said fluid is injected into said tubular member such that said fluid binds to carbon containing molecules in the exhaust and deposits said molecules in said filter.

* * * * *